United States Patent [19]

Hessert

[11] 3,881,552

[45] May 6, 1975

[54] SHUTTING OFF WATER IN GAS WELLS

[75] Inventor: James E. Hessert, Bartlesville, Okla.

[73] Assignee: Phillips Petroleum Company, Bartlesville, Okla.

[22] Filed: Apr. 12, 1973

[21] Appl. No.: 350,532

[52] U.S. Cl............... 166/294; 166/300; 166/305 R
[51] Int. Cl............................................ E21b 33/13
[58] Field of Search .......... 166/270, 275, 294, 300, 166/305 R

[56] References Cited
UNITED STATES PATENTS

| | | | |
|---|---|---|---|
| 3,421,585 | 1/1969 | Barcia | 166/294 |
| 3,658,129 | 4/1972 | Lanning et al. | 166/294 |
| 3,687,200 | 8/1972 | Routson | 166/275 |
| 3,749,172 | 7/1973 | Hessert et al. | 166/270 |
| 3,749,174 | 7/1973 | Friedman et al. | 166/294 |
| 3,757,863 | 9/1973 | Clampitt et al. | 166/270 |
| 3,785,437 | 1/1974 | Clampitt et al. | 166/294 |

Primary Examiner—Frank L. Abbott
Assistant Examiner—Jack E. Ebel

[57] ABSTRACT

In the production of oil and gas, the production of undesirable fluids is inhibited by the injection of a non-aqueous composition containing at least one crosslinkable polymeric material and a two-component catalyst system effective to cause in situ crosslinking of the polymeric material when contacted with water.

17 Claims, No Drawings

SHUTTING OFF WATER IN GAS WELLS

This invention relates to the production of natural gas and oil. In one aspect the invention relates to a new sealing composition which, on contact with water, forms a water-impermeable gel. In another aspect the invention relates to an improved method for selectively controlling the concomitant production of water from gas- and oil-bearing reservoirs.

One of the significant problems attendant to the production of oil and gas from subterranean hydrocarbon-containing formations is the concomitant production of water. Such produced water can be reservoir water, occasioned by coning or such similar phenomenon of the aquifer, or it can be injection water from secondary recovery treatments being applied to the reservoir. Whatever the source, there is an upper limit beyond which water production can no longer be tolerated and its further entry into the producing well bore must be at least reduced if further production of the hydrocarbon resources at that location is to be continued.

Regardless of whether the undersired fluid is a natural drive fluid or an artificial drive fluid such as from secondary recovery projects, miscible displacement projects, etc., the problem is primarily occasioned by the predilection of the drive fluid to preferentially seek the higher permeability zone and to more or less bypass the lower permeability zones.

Among the prior solutions to the problem of undesirable fluid entry is the placing or forming of a plug within the formation. At one time such plugs were of a solid nature, such as cement, regardless of whether the undesirable fluid was liquid or gas. Such solid plugs, while at least partially effective for the intended purpose, inhibit the use of the undesirable fluid to assist in driving the desired fluid from the formation into the producing well bore. In addition, the use of such solid plugs invariably results in a permanent loss of desired fluids. Further, should the undesirable fluids seep by or otherwise bypass such solid plugs, the plug cannot change or shift position to block such seepage or other changes in flow pattern of the undesired fluid.

To overcome the shortcomings of the use of solid plugs such as cement, there has developed the concept of modifying the mobility of fluids present in the subterranean formations. Such methods have generally been directed to modifying the mobility of the hydrocarbon-displacing medium, whether it be a gas or liquid. The mobility of any fluid in a permeable geological formation is the effective permeability of the formation to that liquid divided by the viscosity of the fluid. Thus, a commonly developed method for reducing the mobility of a particular fluid in a permeable geological formation is to increase its viscosity such as by using viscous solutions of partially hydrolyzed polyacrylamides such as described in U.S. Pat. Nos. 2,827,964 and 3,039,529. Another solution to the problem of undesirable fluid entry is taught by Sandiford in U.S. Pat. No. 3,308,885, where it is recommended that aqueous solutions of high molecular weight polyacrylamides are effective for reducing the water-oil ratio in the total well effluent and for increasing the daily production of hydrocarbonaceous fluids. The partially hydrolyzed polyacrylamides in the Sandiford patent are those wherein at least about 8 percent, but not more than 70 percent, of the amide groups have been hydrolyzed to carboxylic acid groups. Following injection of the aqueous solution containing the polyacrylamide into the formation, the well is then placed back on production; and it is found that, under the same conditions as were employed prior to the treatment, there is a substantial reduction in water-oil ratio of the well effluent, due primarily to a reduced flow rate of water into the well bore. Moreover, as a result of this decreased water flow rate, there will be, at the same gross production rate, a reduction in fluid level over the pump, with resultant decrease in backpressure on the formation, thus permitting oil to move more rapidly out of the formation into the well bore. Thus, although the immediate effect of the treating process of the Sandiford patent is to decrease the rate of flow of water into the well bore, a secondary effect of increasing the absolute daily production of oil is also obtainable.

In the actual field practice of the invention method by Sandiford, a disadvantage has been observed. The absorbed and entrapped polymers elute out of the producers very quickly, 15 to 150 days, and the water-oil ratios will rise rapidly back to an undesirable level necessitating retreatment of the producers with the solutions of polyacrylamides.

It is an object of this invention to provide a method for controlling the permeability of a subterranean formation of nonuniform permeability. Another object is to provide a method of selectively plugging the more permeable water channels of a subterranean formation. Another object is to provide an improved waterflooding process wherein the displacement fluid pattern is controlled by selectively plugging the permeable water channels. A further object is to provide a method of controlling water intrusion into a producing well. A still further object is to provide a nonaqueous sealing composition.

These and other objects, advantages and aspects of the invention will be readily apparent to persons skilled in the art from a study of the disclosure and the appended claims.

In accordance with the present invention, there is provided a nonaqueous sealant composition which is readily pumpable, is easily emplaced, and which forms a gel upon contact with water. The resulting gelled composition is resilient.

The invention also provides a method of preferentially inhibiting water production from a subsurface formation. Broadly, the fluid permeability of subterranean formations penetrated by one or more injection and/or producing well bores can be modified by treating such formations through such well bores with nonaqueous compositions comprising crosslinkable, at least water-dispersible, polymers under conditions such that crosslinking or gelation of the polymer is effected in situ within the formation upon contact with water.

More particularly, in accordance with the present invention, the fluid permeability of hydrocarbon-containing subterranean geological formations is modified by a method comprising treating the formation with nonaqueous compositions containing chemically crosslinkable, at least water-dispersible, polymers under conditions such that crosslinking or gelation of the polymer is catalytically effected in situ within the formation.

In accordance with the invention, the formation is treated with a nonaqueous composition comprising at least one chemically crosslinkable, at least water-dispersible, polymer, an oxidizing agent, a reducing agent and at least one polyhydric alcohol. Crosslinking of the polymer(s) is effected chemically in situ within the formation, upon contact with water, with the crosslinking or gelation of the polymeric material being effected by a redox catalyst system, i.e., a system comprising a suitable reducing component and an oxidizing component comprising a reducible polyvalent metal. It is important that the oxidizing component of the redox system be at the highest level of oxidation, e.g., if the oxidizing component is polyvalent chromium, the chromium must be in its highest valence state. In addition to being at the highest valence state, the oxidizing component polyvalent metal must be in a form in which it is not readily available to effect crosslinking of the polymer until such oxidizing component comes into contact with the reducing component in the presence of the crosslinkable polymeric compositions. In other words, the oxidizing ion is in a nonreactive form such as by virtue of association with another element such as oxygen until contacted by the reducing component in the presence of crosslinkable polymer.

Thus, according to the present invention, there is provided a method for reducing fluid permeability of a porous hydrocarbon-containing subterranean formation comprising: introducing into said formation a nonaqueous composition containing a crosslinkable, at least water-dispersible polymer and a sensible amount of a redox sytem; terminating the introduction of said composition; and maintaining the composition in a quiescent state for a period of time to effect mixing of said composition with formation water and in situ crosslinking or gelation of said polymeric materials. The composition need not, however, be maintained in a quiescent state to effect crosslinking or gelation.

In the practice of this invention, the nonaqueous composition containing the described components can be injected into the formation employing conventional pumping equipment. If desired, said compositions can be injected into a selected portion or portions of the formation. When the formation is a subterranean formation penetrated by a well bore, said selected portion(s) can be isolated by employing one or more isolation means at the proper location, such as by the use of packers, bridge plugs and other methods known in the art.

When the nonaqueous compositions used in the practice of the invention are injected down a well bore into a subterranean formation, it may be desirable to procede the composition with a slug of flush liquid such as oil, e.g., in a producing well treatment to reduce the water-oil ratio in and around the well bore. Lease crude oil could be used to flush the well casing and the near-well bore zone of the formation. The flush liquid should be at least sufficient to clear the perforations.

It may be further desirable to follow the nonaqueous composition with a slug of flush liquid such as oil. The flush liquid should be at least sufficient to clear the perforations. Otherwise, the perforations could be blocked or partially restricted when the polymeric composition mixes and crosslinks to form a viscous or firm gel.

In some instances, depending upon the type of formation and the nature of the undesirable fluid, deeply placed compositions, e.g., compositions displaced out into the formation away from the treating well a distance of about 10 to about 200 feet or more, can be employed. Thus, in one embodiment of the invention, the afterflush of oil would be sufficient not only to clear the perforations but also would be sufficient to displace the compositions out into the formation a predetermined desired distance. This embodiment is particularly useful where there are natural or artificially induced fracture systems occupying a relatively small portion of the formation adjacent the well bore.

The amount of the nonaqueous composition and the concentrations of the individual components used in the practice of the invention are functions of the type of formation being treated, the porosity and permeability of such formations and, particularly, the level of permeability modification desired. Generally speaking, the use of any suitable amount is well within the scope of the invention, both as to initial treatments and to retreatments. Thus, the invention is not limited to the use of any particular amount of said nonaqueous crosslinkable polymeric compositions as the permeability-modifying medium. The reservoir permeability in a particular formation can be determined by methods known in the art. For example, a known-sized slug of water containing a marking agent such as a water-soluble or dispersible dye can be injected, followed by continued injection of water until the marking agent is detected at the offending porducing well. The amount of following water so injected will provide an estimate of the reservoir pore volume that is channeling the injection fluid between the injection well and the producing well plus enable an approximation of the formation flow capacitance of this portion of the reservoir. Radioactive tracers can be similarly employed as are dyes as marking agents or materials.

The nonaqueous composition used in the practice of the invention can be injected at any suitable rate and at any suitable pressure. Usually, the injection rate will be within the range of from 0.1 to 50 barrels per minute, preferably 0.5 to 5.0 barrels per minute.

Another embodiment of the invention comprises a combination acidizing-plugging treatment. This embodiment of the invention is particularly useful where the formation is susceptible to attack by an acid, such as a limestone formation. In this combination method, injection of the nonaqueous composition is preceded by a slug of acid sufficient to penetrate into the reservoir rock any desired distance, depending upon the type of formation and permeability thereof. The acid will react with, etch and roughen the rock faces. This will provide a clean and more oil-free rough surface for the composition, following crosslinking of the polymeric materials, to adhere to. It is generally recognized that water-dispersible polymers will absorb at much higher levels on rock surfaces free of oil. The slug of acid can be permitted to remain in the vicinity of the following nonaqueous composition and leak off naturally. Or, if desired, the injection acid slug can be followed immediately with a waterflush to displace the acid. If the acid is permitted to leak off naturally, it is then desirable to inject sufficient fluid to flush the spent or partially spent acid some further distance into the reservoir prior to injecting the nonaqueous composition of this invention. In either event, injection of the nonaqueous composition is preceded by a slug of flush liquid such as oil.

Acids useful in the combination acidizing-plugging embodiment of the invention include any acid which is effective in increasing the flow of hydrocarbons through the formation and into the well. Examples of such acids which can be used include inorganic acids such as hydrochloric acid and nitric acid; organic acids such as acetic acid and formic acid; and combinations of inorganic and organic acids.

The concentration or strength of the acid can vary depending upon the type of acid, the type of formation being treated, and the result desired in the particular treating operation. For example, when hydrochloric acid solution is being used in predominantly limestone formation, the concentration can vary from about 5 to about 38 weight percent hydrocloric acid, with concentrations within the range of 10 to 30 weight percent usually preferred. Organic acids are usually used in lower concentrations, e.g., about 10 weight percent. One preferred mixture of inorganic acid and organic acid comprises mixtures of hydrochloric acid and acetic acid, for example, 15 percent hydrochloric acid solution containing sufficient acetic acid to bring the total acidity to about 20 to 22 percent, based on equivalent hydrochloric acid dissolving capacity. The acids used in the practice of the invention can contain any of the known corrosion inhibitors, deemulsifying agents, sequestering agents, surfactants, friction reducers, etc., known in the art. The amount of acid used in any particular instance will depend upon a number of factors, including the size or amount of formation to be treated, type of formation being treated, the type of acid, the concentration of the acid and the formation temperature. Thus, the invention is not limited to using any particular amount of acid in the combination fracturing-acidizing embodiment of the invention. Any suitable amount of acid, depending upon the nature of the formation being treated and its permeability, can be employed.

When the combination acidizing-plugging treatment is not employed as described above, it will sometimes be desirable to precede the injection of the aqueous compositions with a small slug of acid to clean the well bore, perforations and the formation immediately adjacent the well bore. This can be followed by a small slug of hydrocarbon solvent, if desired, to remove the oil and thus increase polymer retention in the reservoir for subsequent cross-linkings.

The polymeric materials which are suitable for use in the practice of the invention include at least one chemically crosslinkable, at least water-dispersible polymer selected from the group consisting of polyacrylamides and related polymers, cellulose ethers, and polysaccharides which can be crosslinked or gelled when contacted with water in the presence of the catalytic gelling agents described herein. Where used, in the specification and in the claims, unless otherwise specified, the term "polymer" is employed generically to include both homopolymers and copolymers; and the term "water-dispersible polymers" is employed to include those polymers which are truly water-soluble and those which are dispersible in water or other aqueous medium to form stable colloidal suspensions which can be crosslinked as described herein. The term "water-dispersible polymers" is a term of art which describes the action of such polymers when contacted with water. It is used herein only to describe the particular class of polymers useful in this invention.

The polyacrylamides and related polymers which can be employed in the practice of the present invention include at least one chemically cross-linkable, at least water-dispersible polymer which can be used with the catalytic gelling agents hereinafter described to give an aqueous gel upon contact with water; said polymers being selected from the group consisting of: polyacrylamides and polymethacrylamides wherein up to about 75 percent of the carboxamide groups can be hydrolyzed to carboxyl groups; crosslinked polyacrylamides and crosslinked polymethacrylamides wherein up to about 75 percent of the carboxamide groups can be hydrolyzed to carboxyl groups; polyacrylic acid and polymethacrylic acid; polyacrylates; polymers of N-substituted acrylamides wherein the nitrogen atoms in the carboxamide groups can have from 1 to 2 alkyl substituents which contain from 1 to 4 carbon atoms; copolymers of acrylamide with another ethylenically unsaturated monomer copolymerizable therewith, sufficient acrylamide being present in the monomer mixture to impart said water-dispersible properties to the resulting copolymer when it is mixed with water, and wherein up to about 75 percent of the carboxamide groups can be hydrolyzed to carboxyl groups; and admixtures of such polymers. Presently preferred polyacrylamide-type polymers include the various substantially linear homopolymers and copolymers of acrylamide and methacrylamide. By substantially linear it is meant that the polymers are substantially free of crosslinking between the polymer chains. Said polymers can have up to about 75, preferably up to about 45, percent of the carboxamide groups hydrolyzed to carboxyl groups. As used herein and in the claims, unless otherwise specified, the term "hydrolyzed" includes modified polymers wherein the carboxyl groups are in the acid form and also such polymers wherein the carboxyl groups are in the salt form, providing said salts are at least water-dispersible. Such salts include the ammonium salts, the alkali metal salts, and others which are at least water-dispersible. Hydrolysis can be carried out in any suitable fashion, for example, by heating an aqueous solution of the polymer with a suitable amount of sodium hydroxide.

Substantially linear thiosulfate can be prepared by methods known in the art. For example, the polymerization can be carried out in aqueous mediums, in the presence of a small but effective amount of a water-soluble oxygen-containing catalyst, e.g., a thisulfate or bisulfate of potassium or sodium hydroperoxide at a temperature between about 30° and 80° C. The resulting polymer is recovered from the aqueous medium, as by drum drying, and can be subsequently ground to the desired particle size. A presently preferred particle size is such that about 90 weight percent will pass through a No. 10 mesh sieve, and not more than about 10 weight percent will be retained on a No. 200 mesh sieve (U.S. Bureau of Standards Sieve Series).

Included among the copolymers which can be used in the practice of the invention are the at least water-dispersible copolymers resulting from the polymerization of the major proportion of acrylamide or methacrylamide and a minor proportion of an ethylenically unsaturated monomer copolymerizable therewith. It is desirable that sufficient acrylamide or methacrylamide be present in the monomer mixture to impart to the copolymer the above-described water-dispersible properties, for example, from about 90 to about 99 percent acrylamide and from about 1 to 10 percent other ethylenically unsaturated monomers. Such monomers include acrylic acid, methacrylic acid, vinyl sulfonic acid, vinyl benzyl sulfonic acid, vinyl benzene sulfonic acid, vinyl acetate, acrylonitrile, methylacrylonitrile, vinyl alkyl ether, vinyl chloride, maleic anhydride, and the like, Various methods are known in the art for preparing such copolymers, e.g., see U.S. Pat. Nos. 2,625,529; 2,740,522; 2,729,557; 2,831,841; and 2,909,508. Such copolymers can be used in the hydrolyzed form, as discussed above for the homopolymers.

Polyacrylic acids, including polymethacrylic acid, prepared by methods known in the art can also be used in the practice of the invention.

Polyacrylates, e.g., as described in Kirk-Othmer, "Encyclopedia of Chemical Technology," Vol. 1, second edition, pages 305 et seq., Interscience Publishers, Inc., New York (1963), can also be used in the practice of the invention. Examples of such polyacrylates include polymers of methylacrylate, ethylacrylate, N-propylacrylate, isopropylacrylate, N-butylacrylate, isobutylacrylate, tert-butylacrylate, N-octylacrylate, and the like.

Polymers of N-alkyl-substituted acrylamides wherein the nitrogen atoms and the carboxamide groups can have from 1 to 2 alkyl substients which contain from 1 to 4 carbon atoms can also be used in the practice of the invention. Examples of such N-substituted acrylamides include, among others, N-methylacrylamide, N-propylacrylamide, N-butylacrylamide, N,N-dimethylacrylamide, N-methyl-N-sec-butylacrylamide, and the like, at various stages of hydrolysis, as described above.

Crosslinked polyacrylamides and crosslinked polymethacrylamides at various stages of hydrolysis as described above can also be used in the practice of the invention. In general, said crosslinked polyacrylamides can be prepared by the methods described above but including in a monomeric mixture a suitable amount of a suitable crosslinking agent. Examples of crosslinking agents include methylenebisacrylamide, divinylbenzene, vinyl ether, divinylether, and the like. Said crosslinking agents can be used in small amounts, e.g., up to about 1 percent by weight of the monomeric mixture. Such crosslinking is to be distinguished from any crosslinking which occurs when solutions of polymers are gelled as described herein. Mixtures of the above-described polymers can also be used in the practice of the invention.

Representative cellulose ethers which can be used in the practice of the present invention include, inter alia, the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. Many of said cellulose ethers are available commercially in various grades. The carboxy-substituted cellulose ethers are available as the alkali metal salt, usually the sodium salts. However, the metal is seldom referred to and they are commonly referred to as CMC, CMHEC for carboxymethylhydroxyethyl cellulose, etc. For example, watersoluble CMC is available in various degrees of carboxylate substitution ranging from about 0.3 up to the maximum degree of substitution of 3.0. In general, CMC having a degree of substitution in the range of 0.65 to 0.95 is preferred. Frequently, CMC having a degree of substitution in the range of 0.85 to 0.95 is a more preferred cellulose ether. CMC having a degree of substitution less than the above-preferred ranges is usually less uniform in properties and thus less desirable CMC having a degree of substitution greater than the above preferred ranges usually has a lower viscosity and more is required in preparing suitable aqueous compositions. Said degree of substitution of CMC is commonly designated in practice as CMC-7, CMC-9, CMC-12, etc., wherein the 7, 9, and 12 refer to a degree of substitution of 0.7, 0.9, and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 4 or higher.

Representative of the polysaccharides which can be used in forming the polymeric compositions of this invention are the heteropolysaccharides produced by fermentation of carbohydrates by bacteria of the genus Xanthomonas. Exemplary of such heteropolysaccharides are those produced by Xanthomonas campestris, Xanthomonas begonia, Xanthomonas phaseoli, Xanthomonas hederae, Xanthomonas incanae, Xanthomonas carotae, and Xanthomonas translucene. Of these, ionic polysaccharide B-1459 is preferred. The polysaccharide B-1459 is prepared by culturing the bacterium Xanthomonas campestris NRRL B-1459, United States Department of Agriculture, on a well-aerated medium containing commercial glucose, organic nitrogen sources, dipotassium hydrogen phosphate, and various trace elements. Fermentation is carried out to completion in 4 days or less at a pH of about 7 and a temperature of 28° C. Polysaccharide B-1459 is commercially available under the trade name of "Kelzan" from the Kelco Company, San Diego, Calif.

All the polymers useful in the practice of the invention are characterized by high molecular weight. The molecular weight is not critical so long as the polymer has the above-described at least water-dispersible properties. It is preferred that the polymer have a molecular weight of at least 100,000. The upper limit of molecular weight is unimportant so long as the polymer is at least water-dispersible. Thus, polymers having molecular weights as high as 20,000,000 or higher, and meeting said conditions, can be used.

The amount of such polymers used in the practice of the invention can vary widely depending on the particular polymer used, the purity of said polymer and properties desired in the resulting crosslinked composition. In general, the amount of polymer used in preparing the nonaqueous compositions will be that amount which, if prepared with an equal weight of water, would be a water-thickening amount, i.e., at least an amount which would significantly thicken the water to which it was added. Generally speaking, amounts in the range of 0.0025 to 20, preferably 0.001 to 10, weight percent, based upon the weight of nonaqueous medium, can be used in the practice of this invention. However, amounts outside these ranges can be used.

The oxidizing component of the redox catalyst systems which are used in the practice of the invention are water-soluble compounds of polyvalent metals wherein the metal is present in its highest valence state, is capable of being reduced to a lower polyvalent state, and is in a form normally unavailable for reaction, such as combined with oxygen. Examples of such compounds include potassium permanganate, sodium permanganate, ammonium dichromate, the alkali metal chromates and dichromates, and chromium trioxide. Sodium dichromate and potassium dichromate, because of low cost and ready availability, are the presently preferred oxidizing components for use in the catalyst systems of the present invention. The hexavalent chromium in the chromium compounds is reduced in situ to trivalent chromium by suitable reducing agents, as discussed hereinafter. In the permanganate compounds the manganese is reduced from +7 valence to +4 valence.

The amount of oxidizing component used in the practice of the invention will be a sensible amount, i.e., a small but finite amount which is more than incidental impurities, but which is effective or sufficient to cause subsequent gelation when the metal in the oxidizing component is reduced to a lower polyvalent valence state. The lower limit of the concentration of the starting oxidizing component will depend upon several factors including the particular type of polymer or mixture of polymers used, the concentration of the crosslinkable polymer or polymers in the nonaqueous medium, the medium which is used, and the type of crosslinked product desired. Also, the fraction of polymer which is desired to be crosslinked can control the amount of oxidizing component. For similar reasons, the upper limit on the concentration of the oxidizing component of the redox catalyst systems also cannot always be defined. However, as a general guide, the amount of the starting oxidizing components used in preparing the crosslinked compositions in accordance with the invention will be in the range of from 0.05 to 75, preferably 0.5 to 40, weight percent of the amount of polymer used. Stated another way, the amount of the starting oxidizing component of the redox catalyst systems will usually be an amount sufficient to provide at least $3 \times 10^{-6}$, preferably at least $3 \times 10^{-5}$, gram atoms of said metal capable of being reduced per gram of polymer. Preferably, the amount of metal capable of being reduced which is used will not exceed $4 \times 10^{-3}$, more preferably $2 \times 10^{-3}$, gram atoms of said metal per gram of polymer. However, in some situations, it may be desirable to use amounts of starting polyvalent metal-containing oxidizing components which are outside the above ranges. Such use is within the scope of the invention. Those skilled in the art can determine the amount of starting polyvalent metal-containing oxidizing agent to be used by simple experiments carried out in the light of this disclosure. For example, gelation rates are frequently faster when the compositions of this invention are contacted with formation water containing a large quantity of dissolved solids. Oil field brines commonly contain varying amounts of sodium chloride, calcium chloride, magnesium chloride and the like. Sodium chloride is usually present in the greatest concentration. Stable gels can be prepared by contacting the compositions of this invention with brines having a wide range of dissolved solid content, e.g., 850 to 100.000 milligrams per liter total dissloved solids, depending upon the particular polymer and brine used. The word "water" us used generically herein and in the claims, unless otherwise stated, to include such brines, fresh water and other aqueous media which can be gelled in accordance with the invention.

Suitable agents for use as the reducing component in the practice of the present invention include sulfur-containing compounds such as sodium sulfide, sodium hydrosulfite, sodium metabisulfite, potassium sulfite, sodium bisulfite, potassium metabisulfite, sodium sulfite, sodium thiosulfate, ferrous sulfate, thioacetamide, hydrogen sulfide, including hydrogen sulfide naturally present in the formation being treated, and others; and nonsulfur-containing compounds such as hydroquinone, ferrous chloride, para-hydrazinobenzoic acid, hydrazine phosphite, hydrazine dichloride, and others. Some of the above reducing agents act more quickly than others, for example, sodium thiosulfate usually reacts slowly in the absence of heat, e.g., heating to about 125° to 130° F. The presently most preferred reducing agents are sodium bisulfite, sodium hydrosulfite and potassium hydrosulfite.

The amount of reducing agent to be used in the practice of the invention will also be a sensible amount, i.e., a small but finite amount which is more than incidental impurities, but which is effective or sufficient to reduce at least a portion of the higher valence metal in the starting polyvalent metal oxidizing components to a lower polyvalent valence state. Thus, the amount of reducing agent to be used depends, to some extent at least, upon the amount of the starting polyvalent metal-containing oxidizing component which is used. In many instances, it will be preferred to use an excess of reducing agent to compensate for exposure to air during preparation of the compositions, and possible contact with other oxidizing substances such as might be encountered in field operations. As a general guide, the amount of reducing agent used will generally be within the range of from 0.1 to at least 300, preferably at least about 200, weight percent of the stoichiometric amount required to reduce the metal in the starting polyvalent to said lower polyvalent valence state, e.g., +6 chromium to +3 chromium. However, in some instances, it may be desirable to use amounts of reducing agent outside said ranges. The use of such ranges is within the scope of the invention. Those skilled in the art can determine the amount of reducing agent to be used by simple experiments carried out in the light of this disclosure.

Suitable liquids for use as the medium component in the practice of the present invention include polyhydric alcohols such as glycerol, glycols, glycol ethers and the like. Representative of such liquids are glycerine, diethylene glycol, propylene glycol, polyoxyethylene glycol and polyoxypropylene glycol.

Two essentials to this invention are that the liquid medium must be (1) miscible in all proportions with water and (2) essentially water-free. The liquid medium must be miscible with water so that when the compositions of this invention contact formation water, a gel can form. Obviously, if the liquid medium is immiscible, no gel can form. Further, the liquid medium must be essentially water-free, in order to prevent premature or undesirable gelation.

Monohydric, or simple, alcohols can also be employed in the practice of this invention as diluents for the polyhydric alcohols. Such simple alcohols have the general formula $C_nH_{2n+1}OH$, where n is an integer having a value of 1 to 6. Representative of such simple alcohols are methanol, ethanol, propanol, isopropanol and the like. The simple alcohols must also be essentially water-free. They can be employed in amounts ranging from 1 to 50 parts per 100 parts polyhydric alcolhol.

Various methods can be used for preparing the nonaqueous compositions used in the practice of the present invention. For example, the polymer can be admixed with the polyhydric alcohol, followed by the reducing agent, then the oxidizing agent. The dry components can also be premixed, then added to the liquid at some later time.

An advantage of the present invention is that ordinary ambient temperatures and other conditions can be used in practically all instances in preparing the nonaqueous compositions used in the practice of the present invention. The present crosslinked polymer treatments are particularly useful in fluid drive operations for the secondary recovery of oil. Such crosslinked polymer compositions are applicable for decreasing the permeability of non-fractured porous formations prior to or during secondary recovery operations, such as fluid drive processes, as well as for water shutoff treatments in producing wells. In such processes the nonaqueous compositions can be introduced into the formation prior to or subsequent to another injected fluid. For example, in one particular useful application the nonaqueous compositions of the present invention can be injected after a previously injected slug of a fluid such as a nonaqueous and/or oil-containing fluid which serves to loosen the oil from the formation. Following placement in the formation, the nonaqueous compositions of the present invention can then be followed by a nonaqueous fluid to push such compositions toward the production well. In one embodiment of the invention, a conventional waterflood or gas drive can be carried out in conventional manner until the drive fluid breaks through into the production well in excessive amounts. Nonaqueous compositions in accordance with the present invention can then be pumped down the well and into the porous formation in any suitable manner, in any suitable amount, and for any desired period of time sufficient to obtain the desired in-depth penetration and decrease in permeability of the high permeability zones of such formations. Usually, an in-depth penetration of from 10 to 1,000, preferably 10 to 500, feet from the injection well will be sufficient. However, this can vary from formation to formation and penetration outside said ranges can be used. For example, there can be injected in accordance with the present invention via the injection well into the formation from about 0.0001 to about 0.5 pore volume of nonaqueous compositions in accordance with the invention over a suitable period of time ranging from 1 day to 6 months.

In another embodiment of the invention, the porous formation can be treated prior to carrying out the fluid drive secondary recovery operations. This embodiment is particularly applicable where there is a good knowledge of the nature of the formation. Thus, in such a formation, where the oil-bearing strata are interspersed with more permeable porous strata which contain no oil, or an insufficient amount of oil to make secondary recovery operations economical, but which more permeable state strata would still act as a thief zone, the formation can be treated in accordance with the invention prior to initiating the fluid drive operation.

In still another embodiment, the invention can be applied to producing wells, either oil wells or gas wells, where there is a more porous nonhydrocarbon-bearing strata adjacent the hydrocarbon-bearing strata. For example, such a condition can exist where there is a water sand or previously waterflooded sand adjacent the hydrocarbon-bearing sand and the water intrudes into the bore hole and interferes with the production of hydrocarbon. In such instances, the formation can be treated in accordance with the invention to shut off the flow of water. The method of carrying out such a high water treatment is substantially the same as described above in connection with fluid drive operations.

It is also within the scope of the invention to carry out the techniques of the invention periodically or intermittently, as needed, during the course of the fluid drive secondary operation, or during the production of oil, gas or water from a producing well.

In all of the above operations, the injection of the nonaqueous composition can be carried out in conventional manner. The nonaqueous mixture of the various components of the present invention can be prepared in advance, stored in suitable tanks, and then pumped into the well in a desired sequence.

The method of this invention and the improved performance resulting therefrom are shown in the following examples, which are illustrations and are not intended as limitations of the scope of the appended claims.

EXAMPLE I

This example illustrates the formation of an aqueous gel in accordance with this invention. A nonaqueous composition was prepared according to the following recipe:

| | |
|---|---|
| 120 | milliliters glycerine |
| 80 | milliliters ethylene glycol |
| 15 | grams sodium carboxymethyl cellulose having a degree of substitution of about 0.9 |
| 0.2 | gram sodium dichromate in 10 milliliters of methanol |
| 0.1 | gram sodium bisulfite |

The above ingredients were admixed with stirring in the order listed.

90 Milliliters of Bartlesville tap water were then added to the nonaqueous composition. Within about 5 minutes, a firm gel formed.

EXAMPLE II

A nonaqueous composition in accordance with the invention was prepared for use in the following example according to the following recipe:

| | |
|---|---|
| 75 | milliliters ethylene glycol |
| 25 | milliliters methyl alcohol |
| 2.0 | grams sodium carboxymethyl cellulose having a degree of substitution of about 0.9 |
| 0.2 | gram sodium dichromate |
| 0.2 | gram sodium bisulfite |

The ingredients were admixed with stirring in the order listed. The resulting composition was stirred approximately 30 minutes before use.

EXAMPLE III

This example illustrates the effectiveness of the nonaqueous compositions of this invention in reducing the permeability of oil-bearing formations with respect to water. The test was conducted utilizing an artificially fractured sandstone core from the North Burbank Field, Osage County, Oklahoma. The core had the dimensions of 1 inch in diameter by approximately 2½ inches in length. The core was fractured lengthwise, then mounted so as to provide an approximately 1/32 inch fracture, in epoxy, encased in an aluminum tube. The mounted core was placed in a horizontal position in a plastic core holder equipped with pressure fittings on its opposite faces so that desired liquids could be forced lengthwise through the core.

The mounted core was placed in a simulated restored state by flooding with Bartlesville tap water at a differential pressure of 250 mm of mercury and at a flow rate of 150 cc/min. The core was then flushed with 10 milliliters of a 23 cp lubricating oil. The oil-flushed core was the treated with 5 milliliters of the composition of Example II.

Immediately after treating with the nonaqueous composition of this invention, water was again opened to the core. There was no water flow through the core once water came into contact with the nonaqueous composition. Water pressure of 250 mm Hg was maintained upon the core. After 6 hours there was no detectable flow through the core. The pressure was then increased to 1,000 mm Hg. No flow through the core was detected at the increased pressure.

Reasonable variations and modifications are possible within the scope of this disclosure without departing from the spirit and scope thereof.

I claim:

1. A method for preferentially inhibiting production of water from a subsurface fluid hydrocarbon productive formation, the producing interval of which includes a watered-out portion and a portion capable of producing a substantial percentage of fluid hydrocarbon, comprising the steps of treating the producing interval by introducing into it a nonaqueous treating fluid, which on contact with water forms a water-impermeable gel, thereafter contacting the treating fluid with water then terminating the injection of said treating fluid and thereafter placing the treated formation on production, said treating fluid comprising:
   a. at least one water-soluble or at least water-dispersible polymeric material selected from the group consisting of polyacrylamides, cellulose ether and polysaccharides;
   b. an oxidizing agent selected from the group consisting of water-soluble compounds of polyvalent metals wherein the metal is present in its highest valence state and is capable of being reduced to a lower polyvalent state upon contact with a reducing agent;
   c. a reducing agent effective to reduce the higher valence metal in said oxidizing agent (b) to a lower polyvalent valence state; and
   d. at least one polyhydric alcohol selected from the group consisting of glycerol, alkylene glycols, polyoxyalkylene glycols, and mixtures thereof; in amounts of each component identified as (a) to (d) as follows: from 0.001 to 10 parts of component (a) per 100 parts of component (d); an amount of component (b) at least sufficient to yield $3 \times 10^{-6}$ gram-atoms of said metal (b) per gram of polymeric material (a) present; an amount of component (c) at least sufficient to reduce said metal (b) to a lower polyvalent valence state.

2. A method according to claim 1 wherein said fluid hydrocarbon comprises natural gas.

3. A method according to claim 1 wherein said fluid hydrocarbon comprises liquid petroleum.

4. A method according to claim 1 wherein said treating fluid additionally contains therein an alcohol having the general formula, $C_nH_{2n+1}OH$, where $n$ is an integer having a value of 1 to 6, in an amount ranging from 1 to 50 parts per 100 parts polyhydric alcohol.

5. A method according to claim 1 wherein said polymer is carboxymethylcellulose, said oxidizing agent is sodium dichromate, said reducing agent is sodium hydrosulfite, and said polyhydric alcohol is a mixture of ethylene glycol and glycerine.

6. A method according to claim 4 wherein said polymer is carboxymethylcellulose, said oxidizing agent is sodium dichromate, said reducing agent is sodium hydrosulfite, said polyhydric alcohol is ethylene glycol and said alcohol is methanol.

7. A method according to claim 1 wherein there is introduced into said formation prior to the introduction of said treating fluid a fluid petroleum.

8. A method for selectively plugging the permeable water channels of a subsurface formation of nonuniform permeability penetrated by at least one well which comprises:
   introducing into said subsurface formation a nonaqueous treating fluid which, on contact with water, forms a water-impermeable gel;
   displacing said fluids into said formation a distance from said well; subsequently contacting the treating fluid with water; and
   thereafter placing the treated formation on production;
   said treating fluid comprising
   a. at least one water-soluble or at least water-dispersible polymeric material selected from the group consisting of polyacrylamides, cellulose ether and polysaccharides;
   b. an oxidizing agent selected from the group consisting of water-soluble compounds of polyvalent metals wherein the metal is present in its highest valence state and is capable of being reduced to a lower polyvalent state upon contact with a reducing agent;
   c. a reducing agent effective to reduce the higher valence metal in said oxidizing agent (b) to a lower polyvalent valence state; and
   d. at least one polyhydric alcohol selected from the group consisting of glycerol, alkylene glycols, polyoxyalkylene glycols, and mixtures thereof; in amounts of each component identified as (a) to (d) as follows: from 0.001 to 10 parts of component (a) per 100 parts of component (d); an amount of component (b) at least sufficient to yield $3 \times 10^{-6}$ gram-atoms of said metal (b) of polymeric meterial (a) present;; an amount of component (c) at least sufficient to reduce said metal (b) to a lower polyvalent valence state.

9. A method according to claim 8 wherein there is introduced into said formation subsequent to introduction of said treating fluid a fluid petroleum.

10. A method according to claim 9 which comprises:
    introducing a fluid petroleum into said well communicating with said formation;

introducing a nonaqueous treating fluid;
introducing a fluid petroleum; and
displacing said fluids into said formation a distance from said well.

11. A method according to claim 8 wherein said (a) polymer is carboxymethylcellulose, said (b) oxidizing agent is sodium dichromate ions, said (c) reducing agent is sodium hydrosulfite and said (d) polyhydric alcohol is a mixture of ethylene glycol and glycerine.

12. A method according to claim 8 wherein there is additionally present a simple alcohol having the general formula, $C_nH_{2n+1}OH$, where n is an integer having a value of 1 to 6, in an amount ranging from 1 to 50 parts per 100 parts polyhydric alcohol.

13. A method according to claim 12 wherein said polymer is carboxymethylcellulose, said oxidizing agent is sodium dichromate, said reducing agent is sodium hydrosulfite, said polyhydric alcohol is ethylene glycol and said alcohol is methanol.

14. A method according to claim 1 wherein said subsurface formation is treated with an acid prior to introduction of said treating fluid.

15. A method according to claim 14 wherein said acid is hydrochloric acid.

16. A method according to claim 8 wherein said subsurface formation is treated with an acid prior to introduction of said fluid petroleum.

17. A method according to claim 16 wherein said acid is hydrochloric acid.

* * * * *